Dec. 22, 1925.
E. M. SMITH
METHOD OF FORMING DOUBLE CUT PIPE
Filed April 16, 1923
1,566,624
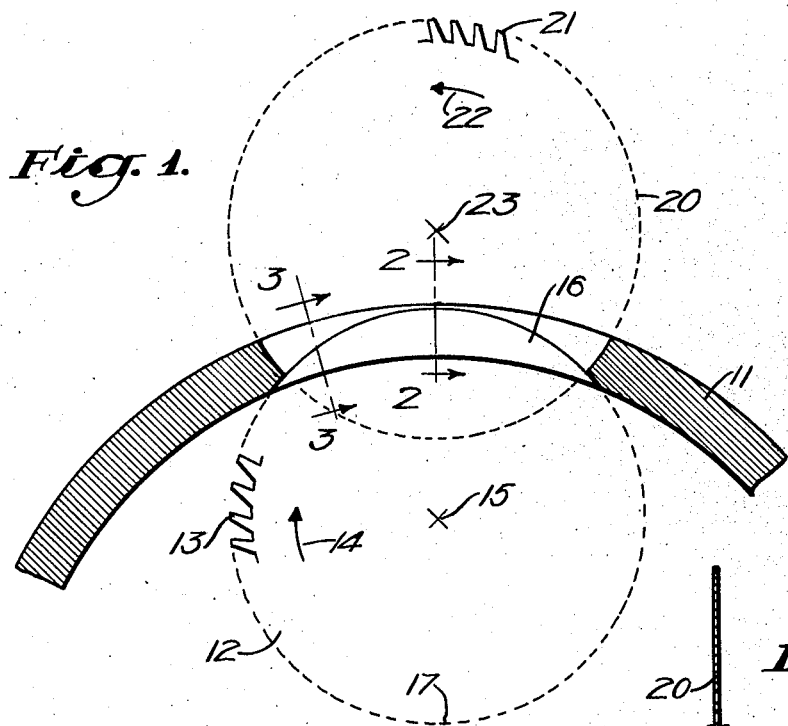
Fig. 1.
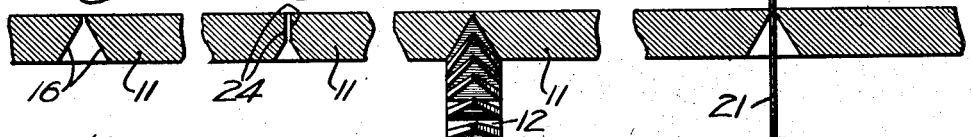
Fig. 2.   Fig. 3.   Fig. 4.
Fig. 5.
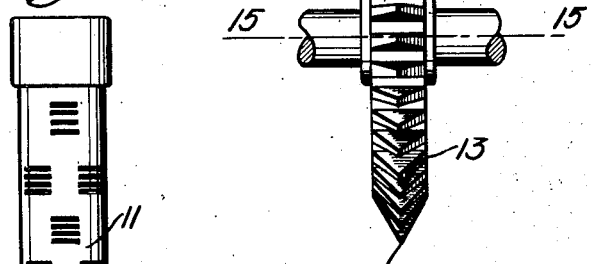
Fig. 6.
INVENTOR:
EDWARD M. SMITH,
BY
ATTORNEYS Patented Dec. 22, 1925.

1,566,624

UNITED STATES PATENT OFFICE.

EDWARD M. SMITH, OF LOS ANGELES, CALIFORNIA.

METHOD OF FORMING DOUBLE-CUT PIPE.

Application filed April 16, 1923. Serial No. 632,571.

*To all whom it may concern:*

Be it known that I, EDWARD M. SMITH, a citizen of the United States, residing at Los Angeles, in the county of Los Angeles and State of California, have invented a new and useful Improvement in Methods of Forming Double-Cut Pipe, of which the following is a specification.

My invention relates to the art of slotting pipe. Slotted pipe is used in oil wells for the purpose of holding back the sand and gravel and allowing the oil to pass readily therethrough into the interior of the well. It is common in the art to provide a pipe of this nature, which pipe is provided with longitudinal or circumferential slots.

In my joint application with Richard D. Heidrick, Serial No. 538,220, filed February 21, 1922, I disclose a machine for producing a slotted pipe, the slots forming key-stone shaped openings, that is to say openings which are narrower on the outside of the pipe than they are on the inside. These key-stone shaped openings are produced by the machine described in said joint application in which I use cutters, having a conoidal cutting surface.

The pipe produced by the machine shown in said joint application is entirely satisfactory, except where a very fine sand is encountered in which event it is difficult to produce a pipe, by said machine, in which the slots are of very narrow width. For the purpose of producing relieved slots, that is to say slots which are wider at the inner surface of a pipe than they are at the outer in which the slots will be very narrow, I have devised the method hereinafter disclosed.

In the application of this method I employ the machine disclosed in said joint application or any other suitable machine. I employ inside the pipe a conoidal toothed cutter which cuts a slot on the interior of the pipe, this slot being much wider at the inner surface of the pipe than it is toward the outer surface. In the method hereinafter described, I do not, however, allow the conoidal cutter to cut entirely through the pipe throughout the entire width of the slot, but merely allow the internal conoidal cutter to cut a slot which is nearly through the pipe. This provides a slot which is quite wide at the internal surface of the pipe, but which tapers up to a point near the outer surface of the pipe. I then complete the slot by means of a thin toothed cutter, which cuts into the pipe from the outside. By using very thin external cutters, I am able to produce a slot which is very thin at the outside, this slot extending into and forming a continuation of the tapered slot produced by the inner cutter.

Referring to the drawing, which is for illustrative purposes only, Fig. 1 is a diagram showing the method of operation and a section of the pipe produced by my method.

Fig. 2 is a section on a plane represented by the line 2—2 of Fig. 1.

Fig. 3 is a section on a plane represented by the line 3—3 of Fig. 1.

Fig. 4 is a section through the pipe showing the internal conoidal cutter just as it is finishing its operation.

Fig. 5 is a section showing the external disc cutter just as it is finishing its operation.

Fig. 6 is a perspective view on a small scale of the pipe produced by my process. Referring to the drawings, a pipe to be cut is shown at 11. I prefer to cut slots in this pipe which extend circumferentially around the pipe through a limited arc and these slots may either be single or cut in gangs as shown in Fig. 6, in which case a number of circular cutters may be used or they may be cut singly. In either event, I use a conoidal cutter shown at 12, which cutter is provided with teeth 13 and which cutter revolves about its axis 15. By the use of the cutter 12, I am able to cut a slot, having conoidal sides 16.

In practice the internal cutter is forced outwardly against the inner surface of the pipe 11, until the point 17 of the cutter is just short of the outside surface of the pipe 11 on the plane 2—2. In other words, the slotting operation is continued until just before the point 17 of the cutter 12 would start to break through on the plane 2—2. The internal cutter 12 is then withdrawn and an external cutter 20 having teeth 21 on its periphery is rotated in the direction 22 around its axis 23, being forced downwardly into the slot formed by the cutter 12 and completing the slot by cutting a straight edge slot, having walls 24. The cutter 20 may be made extremely narrow so that the outer portion of the slot formed by the walls 24 is extremely narrow thus excluding fine sand from the interior of the pipe.

I am able by this means to produce a slot which is very accurate in width at the exterior of the pipe and which is to a large extent relieved so that there is very little tendency for the slot to clog. By the use of a slot of this character, I am able to produce a pipe having slots which will hold back very fine sand, these slots being so formed as to prevent sand from accumulating therein.

While I have shown a slot produced by two rotating cutters, and while I have shown this slot as extending circumferentially about the pipe, I wish it to be understood that this discloses only one of several methods of utilizing my invention which should be limited only by the annexed claims.

I claim as my invention:

1. A method of producing a slotted pipe which comprises: forming a portion of a slot by means of a cutter situated inside the pipe; and completing said slot by means of a cutter situated outside of said pipe.

2. A method of producing a slotted pipe which comprises: forming a portion of a slot by means of a toothed cutter rotating about an axis inside the pipe; and completing said slot by means of a toothed cutter rotating about an axis outside of said pipe.

3. A method of producing a slotted pipe which comprises: forming a portion of a slot by means of a toothed cutter rotating about an axis inside the pipe; and completing said slot by means of a toothed cutter rotating about an axis outside of said pipe, said inner cutter being of greater axial width than said outer cutter.

4. A method of producing a slotted pipe which comprises: forming a portion of a slot by means of a conoidal toothed cutter situated inside the pipe; and completing said slot by means of a comparatively narrow slotting cutter situated outside of said pipe.

5. A method of producing slotted pipe by cooperating internal and external slots formed by moving an inner rotating cutter outwardly in radial direction and an outer rotating cutter inwardly in opposing radial direction.

6. A method of producing slotted pipe by cooperating internal and external slots formed by moving an inner conoidal rotating cutter outwardly in radial direction and an outer narrow slotting cutter inwardly in opposing radial direction.

7. A method of producing slotted pipe by cooperating internal and external slots formed by moving an inner rotating cutter outwardly in radial direction to a point previous to penetration of the pipe, and moving an outer rotating cutter inwardly in opposing radial direction.

8. A method of producing slotted pipe by cooperating internal and external slots formed by moving an inner conoidal rotating cutter outwardly in radial direction to a point previous to penetration of the pipe, and moving an outer narrow slotting cutter inwardly in opposing radial direction.

9. A method of producing a slotted pipe adapted to use in oil wells which comprises: forming a portion of a slot by means of a relatively broad conoidal cutter having a substantially sharp periphery, said cutter being situated inside the pipe; and completing said slot by means of a narrow cutter situated outside of said pipe so that the walls of the narrow portion of the completed slot evenly join the narrowest portion of the walls of the conoidal portion of the completed slot.

10. A method of producing slotted pipe by co-operating internal and external slots comprising: moving an inner conoidal rotating cutter having a substantially sharp periphery outwardly in a radial direction to a point previous to penetration of the pipe; and moving an outer narrow slotting cutter inwardly in an opposing radial direction, the operations being so related that the completed slot is symmetrically funnel-shaped in cross section.

11. A method of producing slotted pipe by co-operating internal and external slots comprising: moving an inner rotating cutter outwardly in a radial direction to a point previous to penetration of the pipe; and moving an outer narrow slotting cutter inwardly in an opposing radial direction, the operations being so related that the completed slot is symmetrically funnel-shaped in cross section.

12. A method of producing a slotted pipe which comprises: forming a portion of a slot by means of a toothed cutter rotating about an axis inside the pipe; and completing said slot by means of a toothed cutter rotating about an axis outside of said pipe, said inner cutter being of greater axial width than said outer cutter, the operations being so related that both slots are of substantially the same length.

13. A method of producing a slotted pipe which comprises: forming a portion of a slot by means of a toothed cutter rotating about an axis inside the pipe; and completing said slot by means of a toothed cutter rotating about an axis outside of said pipe, said inner cutter being of greater axial width than said outer cutter, the operations being so related that the completed slot is symmetrically funnel-shaped in cross section.

14. A method of producing slotted pipe for use in wells which comprises: forming elongated cavities inside a pipe that is initially of substantially uniform thickness, these cavities not extending through the outer wall of the pipe; and thereafter producing slots in the outer wall of the pipe, each slot extending through the pipe and into one of the cavities.

15. A method of producing slotted pipe for use in wells which comprises: forming elongated cavities inside a pipe that is initially of substantially uniform thickness, these cavities being widest at the inner surface of the pipe and not extending through the outer wall of the pipe; and thereafter producing slots in the outer wall of the pipe, each slot extending through the pipe and into one of the cavities.

In testimony whereof, I have hereunto set my hand at Los Angeles, California, this 9th day of April, 1923.

EDWARD M. SMITH.